T. FOSTER.
Hay Fork.
No. 40,098.
Patented Sept. 29, 1863.
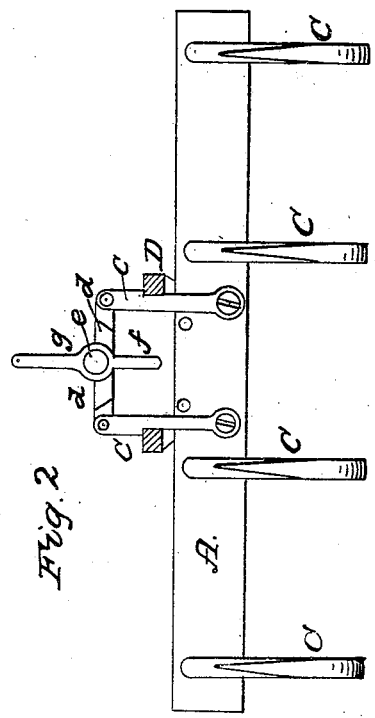
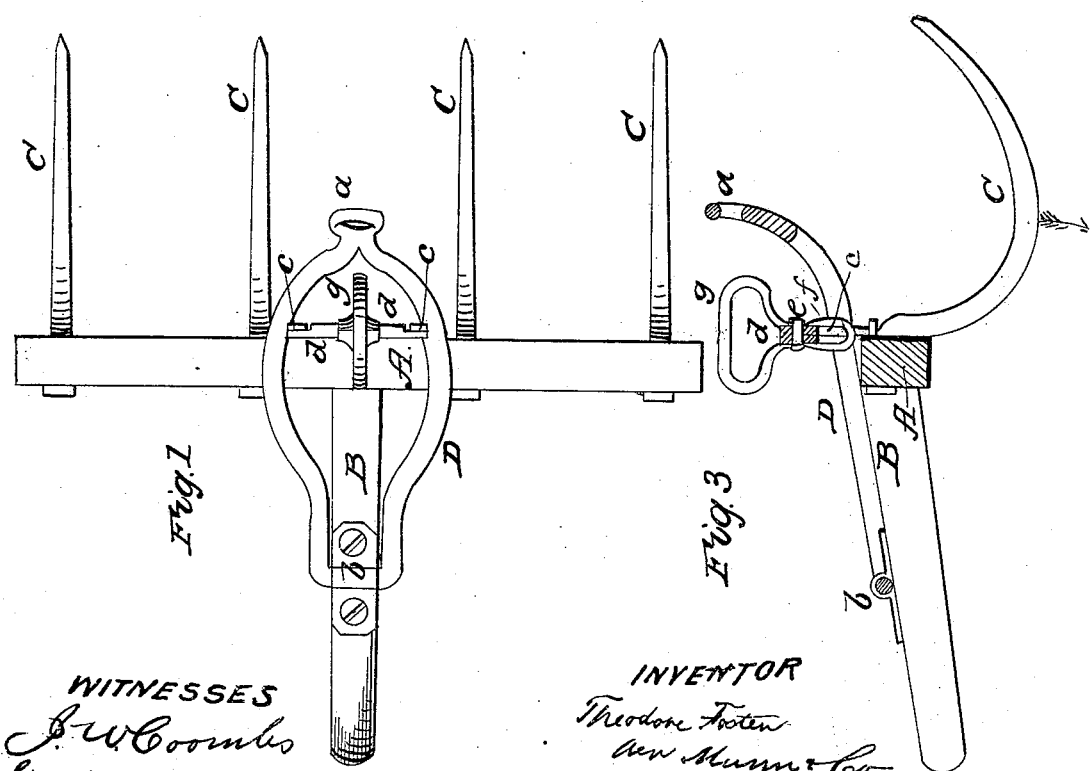

UNITED STATES PATENT OFFICE.

THEODORE FOSTER, OF COXSACKIE, NEW YORK.

IMPROVEMENT IN HAY-FORKS.

Specification forming part of Letters Patent No. 40,098, dated September 29, 1863.

*To all whom it may concern:*

Be it known that I, THEODORE FOSTER, of Coxsackie, in the county of Greene and State of New York, have invented a new and useful Improvement in Hay-Forks; and I do hereby delare that the following is a full, clear, and exact description of the same, reference being had to the accompanying drawings, forming a part of this specification, in which—

Figure 1 represents a plan or top view of my invention. Fig. 2 is a sectional front elevation of the same. Fig. 3 is a longitudinal vertical section of the same, the line $x\ x$, Fig. 1, indicating the plane of section.

Similar letters of reference in the three views indicate corresponding parts.

This invention relates to certain improvements in the arrangement of the bale from which the fork is suspended, and those parts which retain the bale while the fork is hoisted, and release the same and allow the fork to tilt when it is desired to discharge the load; also, to a certain improvement in the position and shape of the tines, whereby the same are rendered more firm and less liable to break than tines of the ordinary construction.

The nature of these improvements will be readily understood from the following description:

A represents the head of the fork, which is made of wood or any other suitable material. This head is rigidly attached to the handle B, and it forms the support for the tines C.

D is the bale or latch, which is provided with a loop, $a$, to receive the hoisting-rope. Said latch is secured by means of a hinge, $b$, to the handle B, and while the fork is being elevated it is retained by two catches, $c\ c$, which are pivoted to the front part of the head A, as clearly shown in Fig. 2 of the drawings. The top ends of those catches are connected to toggle-arms $d\ d$, and when said toggle-arms are brought in a straight line the catches are forced apart and the latch is firmly locked until by depressing the inner ends of the toggle-arms the catches are drawn together and the latch is released. The pivot $e$, which connects the inner ends of the toggle-arms, forms the bearing for a loop, $f$, and ring $g$. The tine which serves to release the latch is secured to the loop $f$, and when the fork, with its load, has been hoisted up to the desired height by pulling said cord the toggle-arms are bent down, causing the catches to release the latch, and the fork is allowed to tilt and to discharge its load.

In order to lock the latch, it is depressed on the head A, and by pulling the ring $g$ the toggle-arms are brought in a straight line, so as to throw the catches out and secure the latch. The toggle-arms are thus thrown in either direction by a direct strain on the loop $f$ in one and on the ring $g$ in the opposite direction, and the latch is not allowed to be locked or released by accident. Furthermore, by attaching the latch to the handle the full strength of the head is preserved and the operation of attaching the latch is considerably facilitated. The tines C of my fork are inserted into the front side of the head, and they are turned down close to said front side, as clearly shown in Fig. 3 of the drawings. The edge of the tine bears against the head, and if a load is placed on the same, which will exert a strain on it in the direction of arrow 1, Fig. 3, the rear edge of the tine is thereby forced against the head, and that part of said tine which passes through the head, instead of being exposed to a strain tending to break it off, is exposed to a strain in the direction of arrow 2. The firmness of the tines is thus materially increased, and they are less liable to snap when overloaded or run against an obstruction than tines of the ordinary construction.

What I claim as new, and desire to secure by Letters Patent, is—

1. The hinge $b$, secured to the top of the handle B, and operating in combination with the latch D and with the fork, in the manner and for the purpose herein shown and described.

2. The ring $g$ and loop $f$, in combination with the toggle-arms $d\ d$, catches $c\ c$, and latch D, all constructed and operating in the manner and for the purpose specified.

THEODORE FOSTER.

Witnesses:
W. R. CHURCH,
A. J. DORMAN.